United States Patent
Kurd

(10) Patent No.: US 8,209,486 B2
(45) Date of Patent: Jun. 26, 2012

(54) CACHE MEMORY

(75) Inventor: Tariq Kurd, Bristol (GB)

(73) Assignee: STMicroelectronics (Research & Development) Limited, Buckinghamshire (GB)

( * ) Notice: Subject to any disclaimer, the term of this patent is extended or adjusted under 35 U.S.C. 154(b) by 796 days.

(21) Appl. No.: 12/217,119

(22) Filed: Jul. 1, 2008

(65) Prior Publication Data

US 2009/0013132 A1    Jan. 8, 2009

(30) Foreign Application Priority Data

Jul. 2, 2007  (EP) .................................... 07252666

(51) Int. Cl.
*G06F 12/08*    (2006.01)
(52) U.S. Cl. .................... 711/118; 711/125; 711/E12.02
(58) Field of Classification Search .................. 711/118, 711/125, E12.02
See application file for complete search history.

(56) References Cited

U.S. PATENT DOCUMENTS 5,854,761 A * 12/1998 Patel et al. ................. 365/49.11
2002/0116567 A1    8/2002 Vondran, Jr.

FOREIGN PATENT DOCUMENTS

WO    WO 99/26140    5/1999

OTHER PUBLICATIONS

Steven Wallace et al., "Modeled and Measured Instruction Fetching Performance for Superscalar Microprocessors", IEEE Transactions on Parallel and Distributed Systems, vol. 9, No. 6, Jun. 1998, pp. 570-578.
Joon-Seo Yim et al., "SEWD: A Cache Architecture to Speed up the Misaligned Instruction Prefetch", IEICE Transactions on Information and System, Information & Systems Society, vol. E80-D, No. 7, Jul. 1997, pp. 742-745.
European Search Report dated Dec. 6, 2007 in connection with European Patent Application No. 07 25 2666.

* cited by examiner

*Primary Examiner* — Yong Choe

(57) ABSTRACT

A cache memory comprises a first set of storage locations for holding syllables and addressable by a first group of addresses; a second set of storage locations for holding syllables and addressable by a second group of addresses; addressing circuitry operable to provide in each addressing cycle a pair of addresses comprising one from the first group and one from the second group, thereby accessing a plurality of syllables from each set of storage locations; and selection circuitry operable to select from said plurality of syllables to output to a processor lane based on whether a required syllable is addressable by an address in the first or second group.

22 Claims, 6 Drawing Sheets

CACHE MEMORY

CROSS-REFERENCE TO RELATED APPLICATIONS

The present application is related to European Patent Application No. 07252666.8, filed Jul. 2, 2007, entitled "CACHE MEMORY". European Patent Application No. 07252666.8 is assigned to the assignee of the present application and is hereby incorporated by reference into the present disclosure as if fully set forth herein. The present application hereby claims priority under 35 U.S.C. §119(a) to European Patent Application No. 07252666.8.

TECHNICAL FIELD

This invention relates broadly to computer system architectures and particularly to a cache memory and to a processor using a cache memory.

BACKGROUND

Processors are known which execute very long instruction word (VLIW) instructions. Generally, VLIW instructions are variable length and are composed of syllables. Each instruction is termed a bundle, and in some examples a bundle can consist of one, two, three or four syllables. A VLIW processor executes VLIW instructions (bundles) on every cycle where it is not stalled. FIG. 1 illustrates a Prior Art layout in a memory 2 of such instructions. It will be appreciated that FIG. 1 shows only a very small part of a memory 2 and in particular shows only the rows within one sector of the memory. In this document, "rows" are used to define a region of memory relating to the issue width of the processor. In the examples discussed herein a row is a 128 bit aligned region of memory. In a VLIW memory as exemplified herein, bundles are aligned to 32 bit boundaries in memory. Therefore, a maximum width (128 bit) bundle has only a one in four chance of being aligned to a 128 bit boundary. In most cases it will not be 128 bit aligned. FIG. 1 shows the case where an instruction $I_1$ is 128 bit aligned beginning at row address addri and a situation where another instruction, $I_2$ is misaligned, commencing at a row address addr[j+64] and with its last syllable at address addr [k+64]. In this case, the address addrj would represent the 128 bit aligned address for the memory 2.

In order therefore to allow bundles to be assembled, existing instruction caches for use with such a memory 2 are constructed to allow four syllable reads to be made from arbitrary 32 bit aligned addresses. A direct mapped cache permitting this is shown in FIG. 2. FIG. 2 illustrates a Prior Art cache 4 having four banks B0, B1, B2, B3. In this example, each bank has a capacity of 8 kilobytes and is 32 bits wide. The cache 4 is connected to an execution unit 6 which comprises a plurality of execution pipelines or lanes L0, L1, L2, L3. Each lane accepts a 32 bit wide syllable from the respective bank of the cache.

In order to allow for non-aligned addresses, each bank comprises an individually addressable RAM. The RAMs are connected to address circuitry 8 via respective address lines ADDR1 . . . ADDR4. Each RAM is addressed by supplying a row address along the respective address line. In the case of instruction $I_1$, it can be seen that the row address for row i can be fed to each of the banks. However, for instruction $I_2$, banks B0 and B1 need to be addressed by the address for row j, whereas banks B2 and B3 need to be addressed by the address for row k. This is shown in more detail in FIG. 3 which illustrates where the syllables ($S1_1$ . . . $S4_2$) of instructions $I_1$ and instructions $I_2$ are stored in the cache 4. As is well known caches are arranged in lines. In a direct mapped cache, each bank has a plurality of addressable locations, each location constituting one cache line. When a cache miss happens a full line is fetched from memory. In principle a line can be any number of bytes, but in the examples discussed herein the cache line length is 64 bytes. Each line has a tag stored with it which states where in memory the cache line came from—this stores the upper bits of the address. The lower bits of the address are used to index the cache (that is to look up the line within the cache) to access the data. Thus, each line contains syllables from main memory and the cache tag (upper bits of the address). Each line is addressable by a cache line address which is constituted by a number of bits representing the least significant bits of the address in main memory of the syllables stored at that row. It will be appreciated therefore that where there is reference here to a rowaddress, this is identified by a number of least significant bits of the address in main memory. Thus, there may be a number of rows in the memory sharing those least significant bits which would map onto any particular line of the cache. In FIG. 1, one sector of the memory is shown which has one row address addri mapping onto line i of the cache.

Direct mapped caches, while simple to construct, have serious performance limitations in some contexts because instructions can only be written into a line of the cache to which it legitimately maps. This may mean that there are unused parts of the cache, while other parts of the cache are being constantly overwritten.

SUMMARY OF THE INVENTION

The deficiencies of the prior art as described above are addressed by the teachings of the present patent document. Broadly, one exemplary cache memory may include a plurality of storage locations, addressing circuitry and selecting circuitry. First and second sets of storage locations operate to hold syllables and are respectively addressable by a first group and a second group of addresses. The addressing circuitry operates to provide in each addressing cycle a pair of addresses comprising one from the first group and one from the second group thereby accessing a plurality of syllables from each of storage locations. The selection circuitry operates to select from a plurality of syllables to output to a processor lane based on whether a required syllable is addressable by an address in one of the first and second groups.

FIG. 4 illustrates one exemplary option for a four-way set associative cache which has greater flexibility than the direct mapped cache discussed above. The cache in FIG. 4 has four ways, WAY0, WAY1, WAY2, WAY3, each way comprising four banks providing a total of sixteen banks. Each bank has a capacity in this example of two kilobytes, but it will be appreciated that any suitable capacity could be adopted. Each bank has a width of 32 bits. The banks of each way are grouped in the sense that bank0, bank4, bank8, bank12 feed one lane, in this case lane 0, of the execution unit 6. There is a similar correspondence for the other banks and lanes. The ways can in principle be commonly addressed row-wise by a common row address. However, the multiplicity of banks within each way has to be taken into account, which in effect means that address circuitry 8 supplies four address lines, each allowing an address to be supplied to a particular bank of a particular way. Considering the grouped banks bank0, bank4, bank8, bank12, these will be addressed by a common row address supplied to the respective way. That row contains four cache entries, one for each bank of the grouped banks, bank0, bank4, bank8, bank12. Thus, this allows four cache entries for one row address. Each time a row is addressed therefore, four cache entries are output. A cache access circuit 10 receives the outputs and further receives the address which was supplied from the address circuitry 8. By making a comparison between the supplied address and the cache tag in the cache, the cache access circuit 10 determines which way holds the correct data and uses a control signal 12 to control a multiplexer $14_0$ to select the correct data to supply to lane 0. Outputs from the remaining grouped banks have similar selection mechanisms with their outputs being connected to the cache access circuit 10, although for reasons of clarity the connections are not shown in full in FIG. 4. The multiplexers are referenced $14_1$ for lane 1, $14_2$ for lane 2 and $14_3$ for lane 3.

A set associative cache provides a much more flexible use of the cache memory than a direct mapped cache, however the addressing structure is more complex.

It is an aim of the present invention to provide a cache memory which allows the flexibility of a set associative cache but with a simplified addressing structure.

According to an aspect of the present invention there is provided a cache memory comprising: a first set of storage locations for holding syllables and addressable by a first group of addresses; a second set of storage locations for holding syllables and addressable by a second group of addresses; addressing circuitry for providing in each addressing cycle a pair of addresses comprising one from the first group and one from the second group, thereby accessing a plurality of syllables from each set of storage locations; and means for selecting from said plurality of syllables to output to a processor lane based on whether a required syllable is addressable by an address in the first or second group.

Another aspect of the invention provides a cache memory comprising a plurality of ways, each way comprising: a first set of storage locations for holding syllables and a cache tag where said syllables are addressable by a first group of addresses; a second set of storage locations for holding syllables and a cache tag in main memory where said syllables are addressable by a second group of addresses; addressing circuitry for providing in each addressing cycle a pair of addresses comprising one from the first group and one from the second group, thereby accessing a plurality of syllables from each set of storage locations; and means for selecting from said plurality of syllables to output based on whether a required syllable is addressable by an address in the first or second group; the cache memory further comprising switching means for selecting from said outputted syllables, syllables associated with one of said ways, based on comparing at least part of the addresses provided by the addressing circuitry with the cache tags held in the storage locations.

In the following described embodiment, the first group of addresses are odd addresses, and the second group of addresses are even addresses, but it will be appreciated that other groupings are possible.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
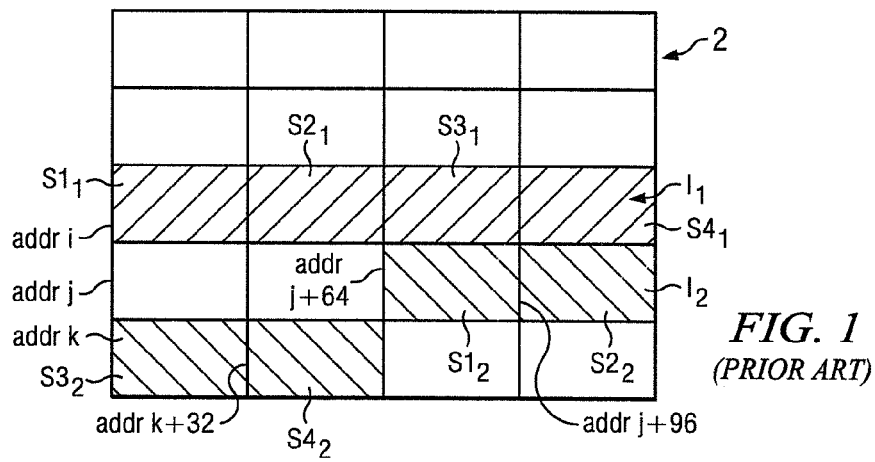
FIG. 1 illustrates a prior art layout in a memory of VLIW syllables.
Figure 2:
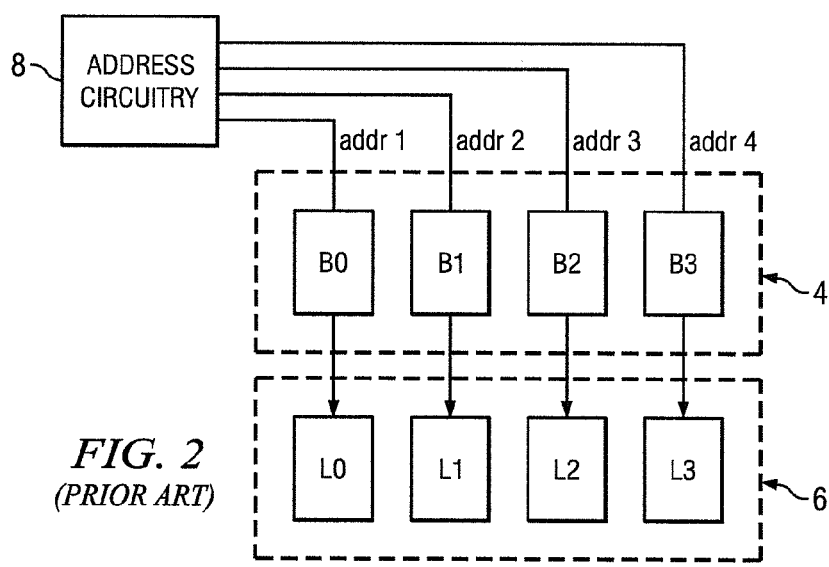
FIG. 2 is a prior art schematic block diagram of a direct mapped cache.
Figure 3:
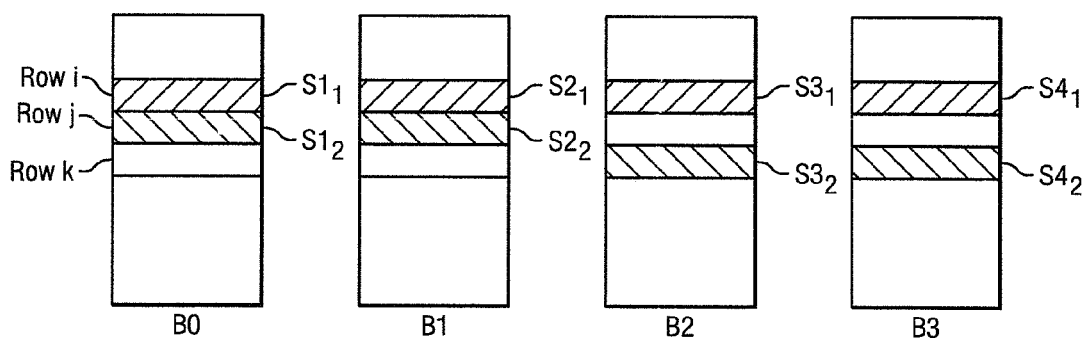
FIG. 3 illustrates a prior art storage of data in a direct mapped cache.
Figure 4:
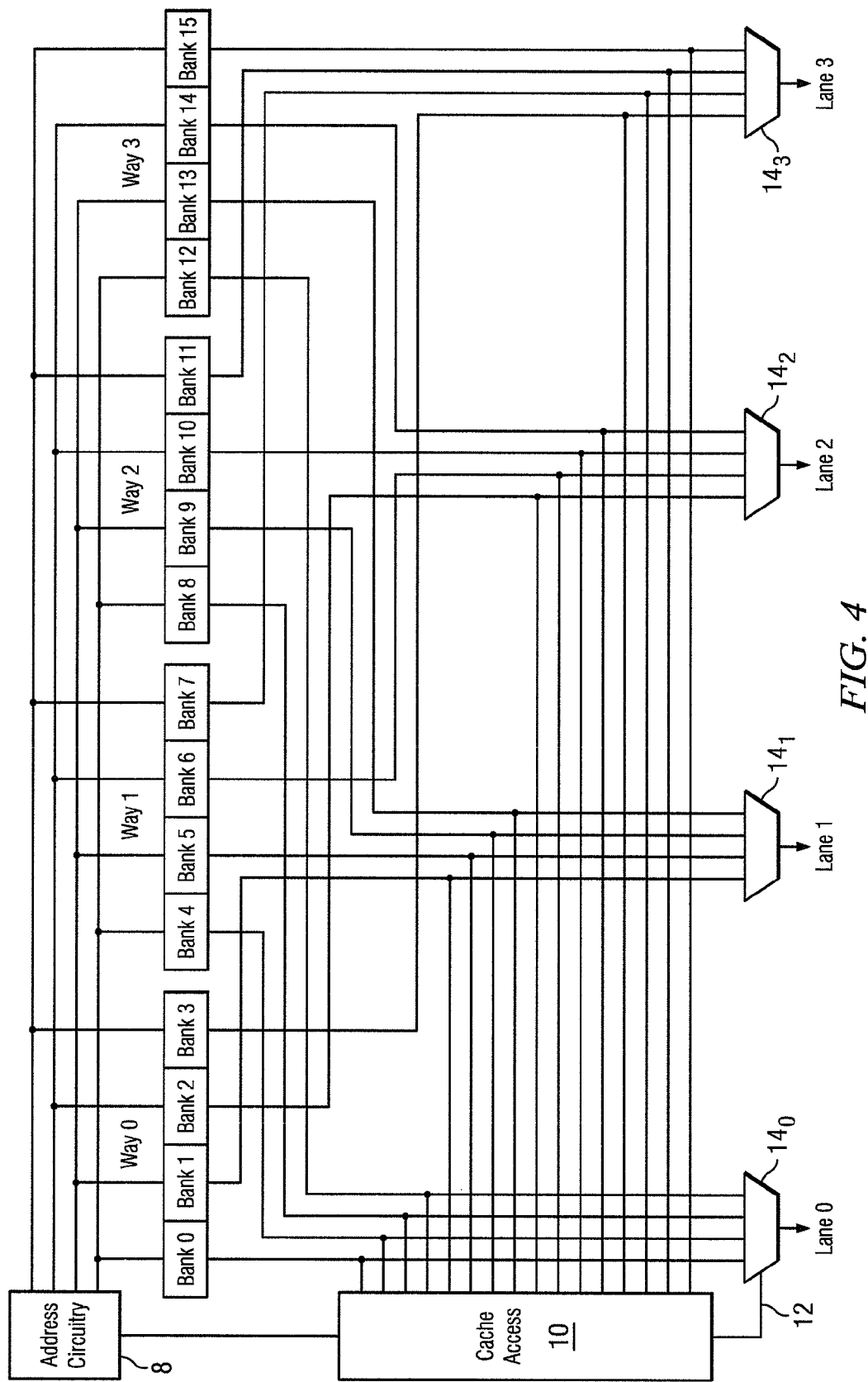
FIG. 4 is a schematic block diagram of a four way set associative cache.
Figure 5:
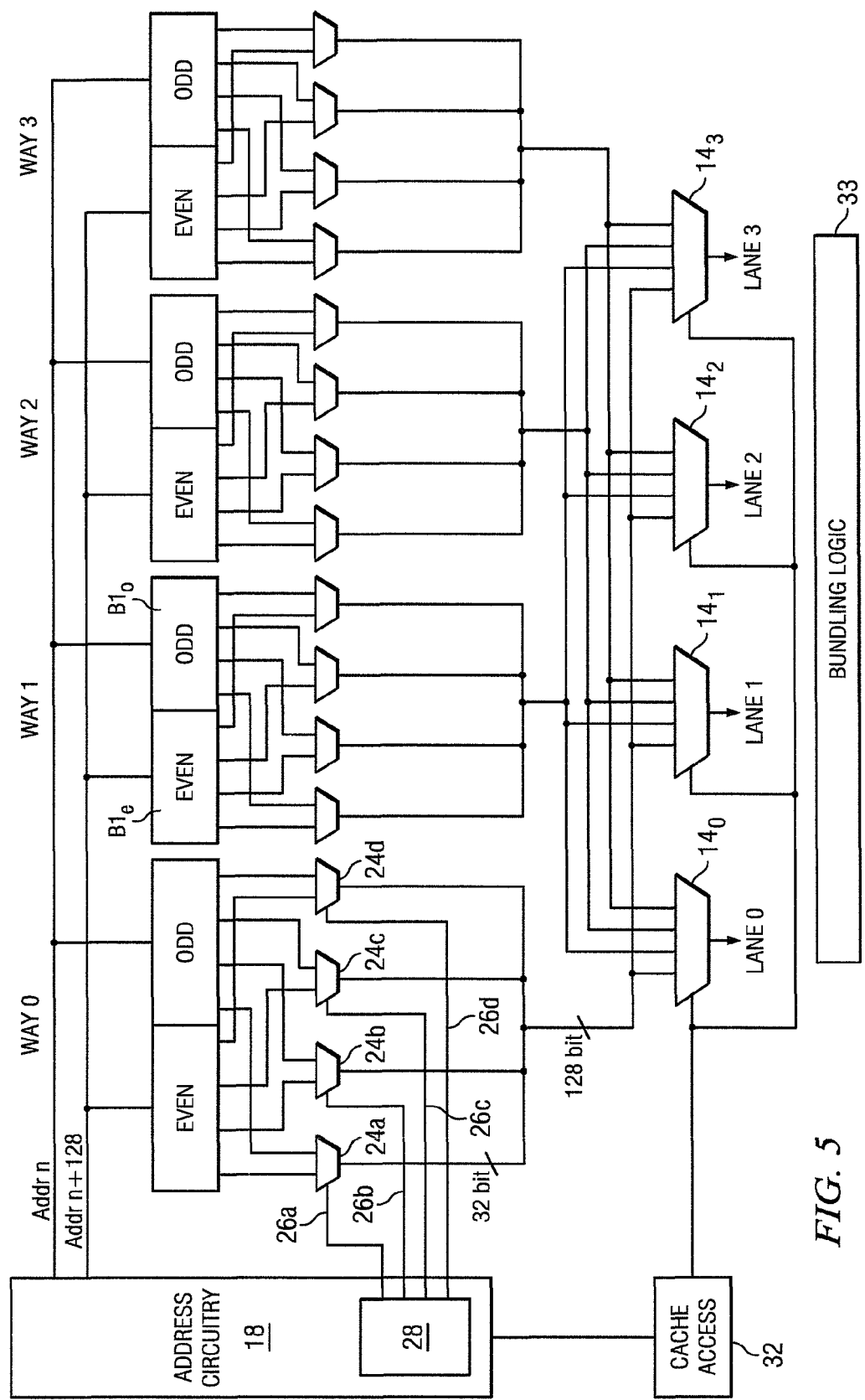
FIG. 5 is a schematic block diagram of one embodiment of the invention.

FIG. 5 illustrates an embodiment of the present invention in the form of a cache memory structure which achieves the benefits of a set associative cache but with reduced addressing complexity. In contrast to the cache structure of FIG. 4, each way of the cache comprises two banks, an even bank and an odd bank. As compared with the direct mapped arrangement of FIG. 2, the number of RAM banks is halved, therefore reducing area overhead. Each bank has a capacity of four kilobytes in this embodiment, but it will be appreciated that any suitable capacity could be utilised. The width of each bank is 128 bits. The banks are labelled according to the following protocol where B denotes bank, the numerical suffix denotes the way and the lower case letter suffix denotes whether it is even or odd. For example $B1_e$ denotes the even bank of way 1. For reasons of clarity not all of the denotations are shown in FIG. 5. In the embodiment of FIG. 5, address circuitry 18 provides two addresses along respective address paths labelled Addrn and Addrn+128. As will be understood from the preceding discussion, when fetching from address n, if n is 128 bit aligned, then n represents the row address for all syllables of a syllable fetch. If n is not 128 bit aligned, then syllables of single fetch can lie either in row n or in the subsequent row, that is the row addressed by n+128. Consequently, the address lines from address circuitry 18 supply addresses for row pairs, where each pair is represented by address n and address n+128. The addresses of even numbered rows are supplied to the even banks $B_e$, whereas the addresses of odd numbered rows are supplied to the odd banks $B_o$.

Each bank is constituted by an addressable RAM. Thus, each way comprises one even RAM and one odd RAM. Four multiplexers 24a, 24b, 24c, 24d are provided for each way because the syllable for each lane can come from either the odd RAM or the even RAM. The multiplexers 24a ... 24d are controlled by respective signals 26a to 26d from an odd/even selection circuit 28 which takes information from the address circuitry 18 about whether the address is odd or even. The four selected syllables from each way are supplied to the lane multiplexers $14_0 ... 14_3$ via a path 30. A cache access circuit 32 selects the correct way to provide the syllables to the lanes based on the full address from the address circuitry 18 in a manner similar to that described above with reference to FIG. 4. Bundling logic 33 organises the syllables back into bundles for applying to the lanes.

Figure 6:
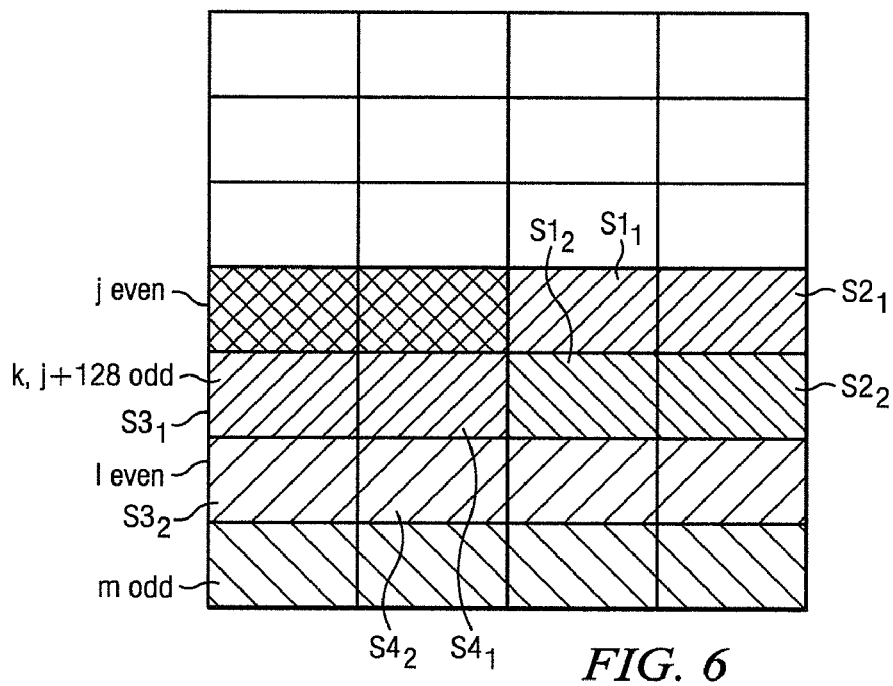
FIG. 6 is a schematic block diagram of VLIW syllables stored in a memory.

FIG. 6 illustrates the organisation in one sector of the main memory 2 to explain how the cache memory structure of FIG. 5 operates. It is worth noting here that, in the event of a cache miss, a fetch is made from main memory of enough bytes to fill a cache line, 64 bytes in this example. This is dependent on the cache architecture and not directly of relevance to the present invention apart from realising that the capacity of a cache line has an impact on fetching as discussed later.

Reverting to FIG. 6, instruction $I_1$ comprises syllables $S1_1$, $S2_1$, $S3_1$ and $S4_1$ crosses a 128 bit boundary. It starts at address j+64 and with the last syllable at address k+32, where j and k denote the rows. In the example of FIG. 6, j is even (e.g. row 6) and k is odd (e.g. row 7). Thus, to recall all syllables of instruction $I_1$ both rows j and k need to be addressed. This is achieved in the embodiment of FIG. 5 by issuing addresses j and j+128 on address paths ADDn and ADDn+128. Address j addresses the even banks, while address j+128 addresses the odd banks. In this case, the multiplexers 24a and 24b are set to "even", while multiplexers 24c and 24d are set to "odd". This is achieved by mapping from the two least significant bits of the address as follows:

| [addrn[1:0] | bank0 | bank1 | bank2 | bank3 |
|---|---|---|---|---|
| 00 | even | even | even | even |
| 01 | odd | odd | odd | odd |
| 10 | odd | odd | even | even |
| 11 | odd | odd | odd | even |

It will further be noted that the fetch for row k (addrj+128) fetches syllables $S1_2$ and $S2_2$ of instruction $I_2$. It will be clear that these syllables are contained in the odd bank $B0_0$ but are not output via the multiplexers 24a . . . 24d. Nevertheless they are available to be accessed on the next processor cycle. This means that subsequent fetches can be aligned, for example the next access can dispatch addresses l and m (m being in the form l+128). In this case, l is even and m is odd. As compared with the earlier arrangements of FIGS. 2 and 4, address timing is faster due to the fact that there are half the number of addresses.

Misaligned fetches may only occur at each PC redirection. The term PC redirection used herein refers to a non-linear change in program count (PC) for any reason, such as taken branch, procedure call, exception or interrupt. That is, the first fetch after each PC redirection will result in five to eight useful syllables. After the first fetch, subsequent fetches are aligned and will always fetch eight useful syllables until another PC redirection occurs, or until the end of the cache line is reached. Fetches described herein are only from one cache line. Any fetch which crosses a cache line will require an extra cache access to complete.

The syllables which are shown cross-hatched in FIG. 6 at the beginning of row j are discarded herein because they are before the target program count of the redirection and are therefore not useful at this stage. It will be appreciated that for any PC redirection, zero to three syllables may have to be discarded resulting in five to eight useful syllables as discussed above.

Figure 7:
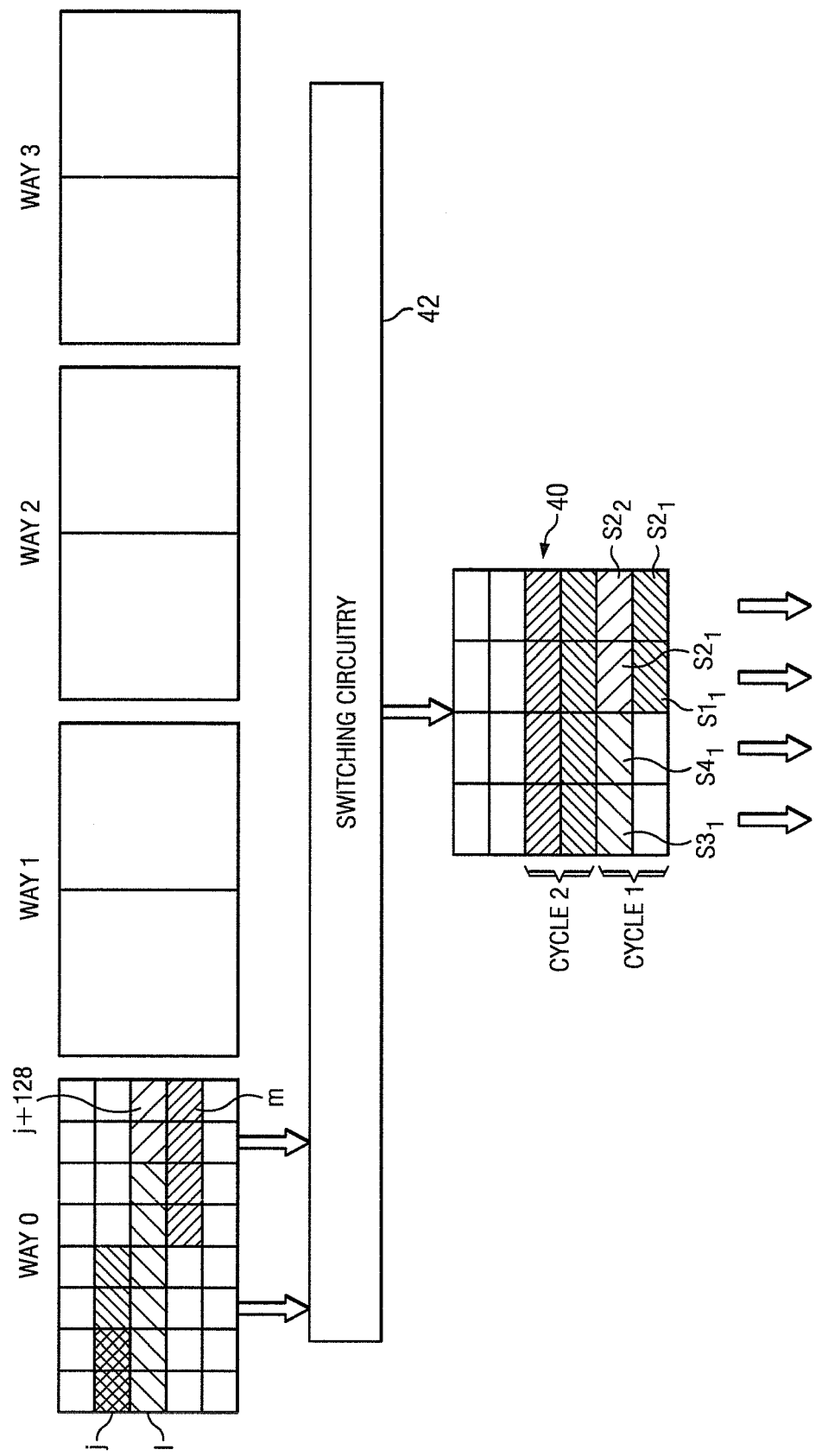
FIG. 7 is a schematic block diagram of an embodiment of the invention including an instruction buffer.

FIG. 7 is a schematic block diagram showing one way, WAY0, with its even and odd banks diagrammatically feeding eight syllables to a buffer 40 in each cycle. The buffer 40 receives syllables from the cache and bundles them to feed them to one to four lanes of the execution unit, depending on how they are bundled. However, instead of only supplying four syllables on each fetch directly to the lanes (as in FIG. 5), it is possible to supply eight syllables into a buffer on each fetch cycle. For the example of FIG. 6, the first eight syllables are those from rows j and j+128, and the next eight syllables in cycle 2 are those from rows l and m (l+128). For this reason the hatching used in FIG. 7 is the same as that used in FIG. 6 because the same syllables are denoted. Note that syllables which are hatched in the same hatching do not denote syllables of the same instruction necessarily, but syllables which are retrieved in the same fetch. The purpose of the buffer is to receive excess syllables fetched from the cache to reduce cache accesses and to hide stalls caused by fetches crossing cache lines. In the event of a PC redirection, the buffer is cleared as the contents are no longer relevant. Syllable fetches are redirected to the target PC required by the PC redirection which has just occurred.

The buffer 40 has the capacity of three complete bundles (three to twelve syllables). In the case that a fetch crosses a cache line boundary, then it will take two cycles to complete the fetch as two separate cache accesses are made. If there are instructions stored in the buffer then this extra cycle of latency can be hidden from the execution pipeline. With the cache memory structure of FIG. 5, five to eight syllables will be received per fetch into the buffer, except in the case where a fetch reaches the end of a cache line where only the syllables remaining from the cache line will be fetched—which will be one to eight if the target of a branch is within eight syllables of the end of a cache line or four or eight syllables for a second or later fetch following a PC redirection. The diagram in FIG. 7 is schematic only and shows the switching circuitry necessary to supply eight syllables per cycle to the buffer 40 as a general block 42. The individual components of the switching circuitry are shown in more detail in FIG. 8.

Figure 8:
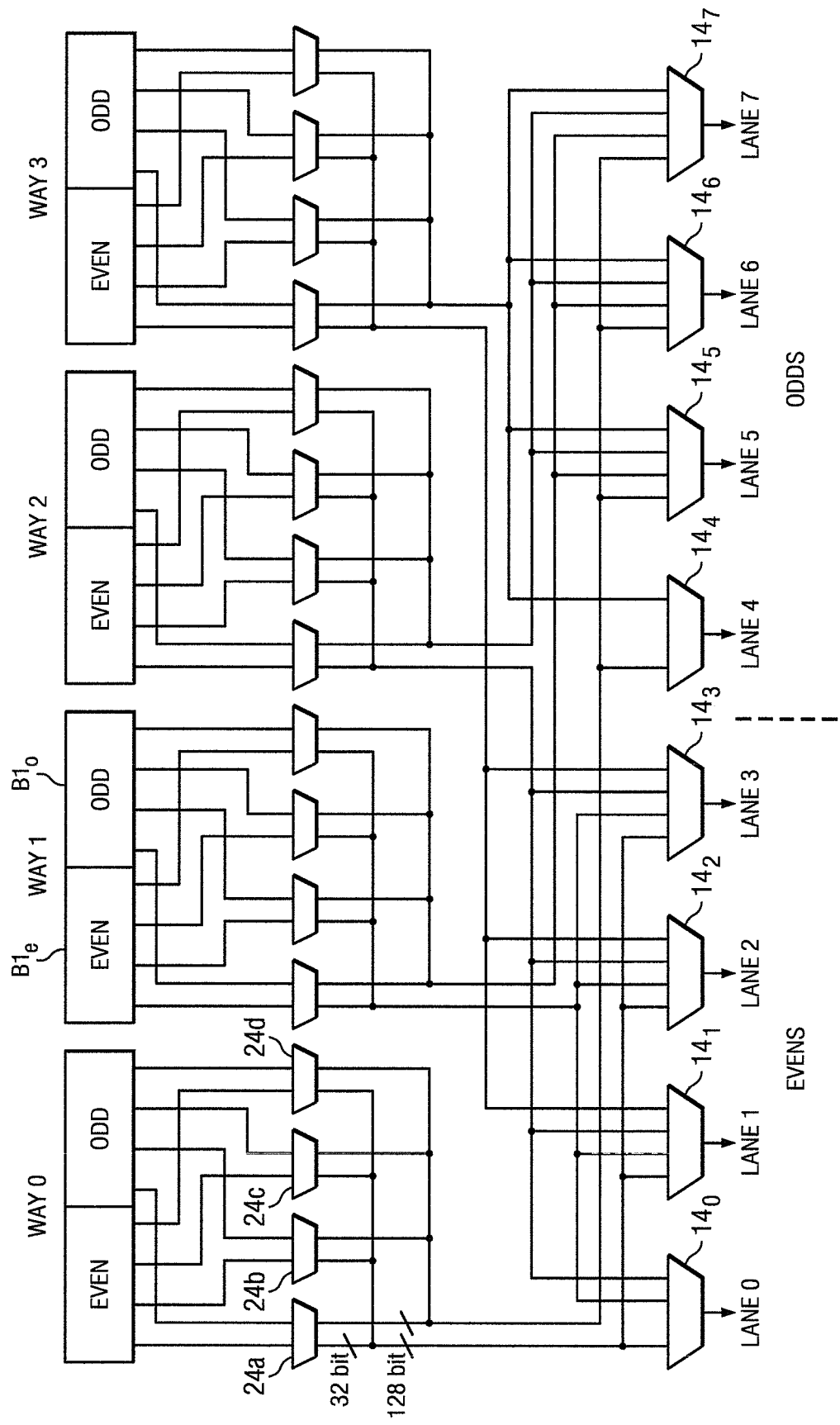
FIG. 8 is a schematic block diagram of a cache for supplying an eight lane execution unit.

In particular, FIG. 8 illustrates the multiplexer 24a . . . 24d which are designated only for WAY0, but of course which are similarly present for WAYS 1 to 3. The control signals for these multiplexers are not shown in FIG. 8, but they will be present in the manner as described with reference to FIG. 5. Such multiplexers 24a . . . 24d has two outputs, one supplying an "even" set of multiplexers $14_0$ . . . $14_3$, and the other supplying an "odd" set of multiplexers $14_4$ . . . $14_7$. The "even" and "odd" multiplexers are controlled by a signal from a cache access circuit 10 similar to that shown in FIG. 5. The control signals are not shown in FIG. 8. These multiplexers are labelled $14_0$ to $14_7$. Although not shown in FIG. 8, bundling logic like that illustrated in FIG. 5 can be used with the embodiment of FIG. 8.

The bundling logic is used in the context of VLIW instructions to dispatch to the lanes syllables which are associated in a particular bundle for each cycle.

Thus according to the above described embodiment an improved cache structure is provided which has a number of advantages.

The instruction cache can be accessed less often, reducing the overall power consumption involved in accesses.

There is an increased likelihood of hiding fetched stalls caused by fetches crossing cache lines. That is, fetching more syllables at once from the cache allows the buffer to fill faster so fetch stalls are more likely to be hidden (e.g. where a fetch crossing a cache line takes two cycles).

Moreover, there is a possibility to build an eight issue processor core with the instruction cache. In the above described embodiment of FIG. 5, the even and odd capability is used to enhance latency by using an instruction buffer 40. However, as shown in FIG. 8 the syllables could be fed directly to the lanes in an eight issue CPU core.

Figure 9:
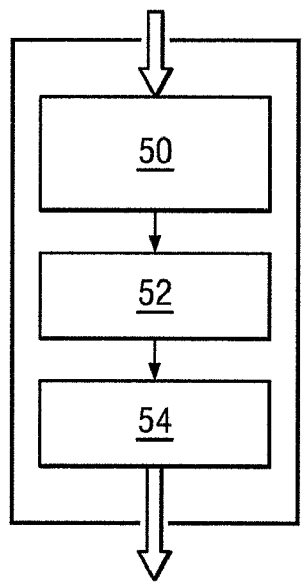
FIG. 9 is a schematic block diagram of a video/audio decode unit for a set top box.
Figure 10:
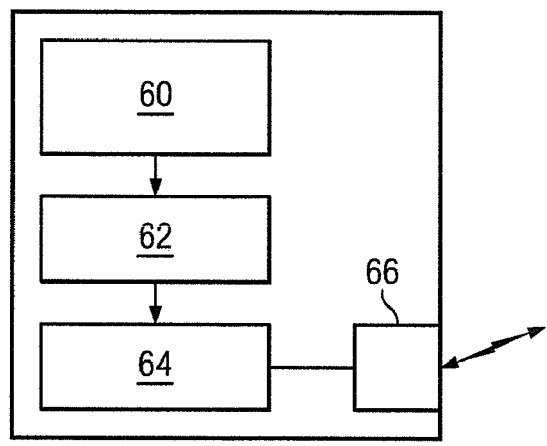
FIG. 10 is a schematic block diagram of a handheld personal computer with a mobile phone capability.

Reference will now be made to FIGS. 9 and 10 to illustrate applications of the cache memory discussed above. FIG. 9 illustrates a video/audio decode unit for a set top box. The unit comprises a main memory 50, a cache memory 52 in accordance with one of the embodiments described above and a processor 54. Video or audio data is streamed into the main memory as denoted by the incoming arrow at the top of FIG.

9 and processed by the processor 54 through the intervention of the cache 52 to generate decoded data indicated by the output arrow at the bottom of FIG. 9.

FIG. 10 is a schematic block diagram of a handheld personal computer with a mobile phone capability. The computer comprises a main memory 60, a cache 62 in accordance with one of the embodiments described above and a processor 64. In addition RF circuitry 66 is provided for implementing a wireless connection for transfer of data in a wireless network.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A cache memory comprising:
   a first set of storage locations configured to hold instruction syllables and addressable by a first group of addresses;
   a second set of storage locations configured to hold instruction syllables and addressable by a second group of addresses;
   addressing circuitry configured to provide in each addressing cycle a pair of addresses comprising one from the first group and one from the second group, thereby accessing a plurality of instruction syllables from each set of storage locations;
   selection circuitry configured to select from the plurality of instruction syllables to output to a processor lane based on whether a required instruction syllable is addressable by an address in one of the first and second groups; and
   a buffer configured to hold the instruction syllables selected from the outputted instruction syllables and to bundle the instruction syllables in accordance with a VLIW (very long instruction word) format.

2. A cache memory according to claim 1, wherein the first group of addresses are odd addresses, and the second group of addresses are even addresses.

3. A cache memory according to claim 2, wherein the addressing circuitry is further configured to provide a control signal to the selection circuitry, the control signal identifying whether a required instruction syllable is addressable by an address in the first or second group.

4. A cache memory according to claim 3, wherein the selection circuitry comprises a plurality of multiplexers, each multiplexer connected to receive an instruction syllable addressable by the first group of addresses and an instruction syllable addressable by the second group of addresses, and to output one of the instruction syllables.

5. A cache memory comprising a plurality of ways, each way comprising:
   a first set of storage locations configured to hold instruction syllables and a cache tag where the instruction syllables are addressable by a first group of addresses;
   a second set of storage locations configured to hold instruction syllables and a cache tag in main memory where the instruction syllables are addressable by a second group of addresses;
   addressing circuitry configured to provide in each addressing cycle a pair of addresses comprising one from the first group and one from the second group, thereby accessing a plurality of instruction syllables from each set of storage locations;
   selection circuitry configured to select from the plurality of instruction syllables to output based on whether a required instruction syllable is addressable by an address in the first or second group;
   a buffer configured to hold the instruction syllables selected from the outputted instruction syllables and to bundle the instruction syllables in accordance with a VLIW (very long instruction word) format; and
   the cache memory further comprising switching circuitry configured to select, from the outputted instruction syllables, instruction syllables associated with one of the ways based on comparing at least part of the addresses provided by the addressing circuitry with the cache tags held in the storage locations.

6. A cache memory according to claim 5, wherein the first group of addresses are odd addresses, and the second group of addresses are even addresses.

7. A cache memory according to claim 6, wherein the addressing circuitry is further configured to provide a control signal to the selection circuitry, the control signal identifying whether a required instruction syllable is addressable by an address in one of the first and second groups.

8. A cache memory according to claim 7, wherein the selection circuitry comprises a plurality of multiplexers, each multiplexer connected to receive an instruction syllable addressable by the first group of addresses and an instruction syllable addressable by the second group of addresses, and to output one of the instruction syllables.

9. A cache memory according to claim 8, comprising buffer logic.

10. A cache memory according to claim 9, wherein the addressing circuitry is configured to provide only a part of each address in the pair to access the instruction syllables.

11. A processor comprising:
    a main memory configured to hold instructions wherein each instruction comprises at least one instruction syllable;
    a cache memory comprising a plurality of ways, each way comprising:
       a first set of storage locations configured to hold instruction syllables and a cache tag where the syllables are addressable by a first group of addresses, and
       a second set of storage locations configured to hold instruction syllables and a cache tag in main memory where the instruction syllables are addressable by a second group of addresses;
    addressing circuitry configured to provide in each addressing cycle a pair of addresses comprising one from the first group and one from the second group, thereby accessing a plurality of instruction syllables from each set of storage locations;
    selection circuitry configured to select from the plurality of instruction syllables to output based on whether a required instruction syllable is addressable by an address in the first or second group;

switching circuitry configured to select, from the outputted instruction syllables, instruction syllables associated with one of the ways based on comparing at least part of the addresses provided by the addressing circuitry with the cache tags held in the storage locations; and a buffer configured to hold the instruction syllables selected from the outputted instruction syllables and to bundle the instruction syllables in accordance with a VLIW (very long instruction word) format; and a plurality of execution lanes, each lane being supplied with an instruction syllable selected from the outputted syllables.

12. A processor according to claim 11, wherein instruction syllables which are not output by the selection circuitry in a first output cycle are held in a buffer and output in a subsequent output cycle.

13. A processor according to claim 12, wherein the number of execution lanes is four.

14. A processor according to claim 11, wherein in the same output cycle instruction syllables which are output by the selection circuitry addressable by an address in the first group are supplied to a first set of execution lanes, and instruction syllables output by the selection circuitry addressable by an address in the second group are output to a second set of execution lanes.

15. A processor according to claim 14, wherein there are four execution lanes in each set.

16. A processor comprising:
a main memory configured to hold instructions wherein each instruction comprises at least one instruction syllable;
a cache memory comprising a plurality of ways, each way comprising:
a first set of storage locations configured to hold instruction syllables and a cache tag where the instruction syllables are addressable by a first group of addresses, and
a second set of storage locations configured to hold instruction syllables and a cache tag in main memory where the instruction syllables are addressable by a second group of addresses;
addressing circuitry configured to provide in each addressing cycle a pair of addresses comprising one from the first group and one from the second group, thereby accessing a plurality of instruction syllables from each set of storage locations;
selection circuitry configured to select from the plurality of instruction syllables to output based on whether a required instruction syllable is addressable by an address in the first or second group; and
switching circuitry configured to select, from the outputted instruction syllables, instruction syllables associated with one of the ways based on comparing at least part of the addresses provided by the addressing circuitry with the cache tags held in the storage locations;
a plurality of execution lanes, each lane being supplied with a instruction syllable selected from the outputted instruction syllables; and
bundling logic connected to the plurality of execution lanes and adapted to receive the instruction syllables and to assemble a bundle in accordance with a very long instruction word (VLIW) format.

17. A processor comprising:
a main memory configured to hold instructions wherein each instruction comprises at least one instruction syllable;
a cache memory comprising a plurality of ways, each way comprising:
a first set of storage locations configured to hold instruction syllables and a cache tag where the instruction syllables are addressable by a first group of addresses, and
a second set of storage locations configured to hold instruction syllables and a cache tag in main memory where the instruction syllables are addressable by a second group of addresses;
addressing circuitry configured to provide in each addressing cycle a pair of addresses comprising one from the first group and one from the second group, thereby accessing a plurality of instruction syllables from each set of storage locations;
selection circuitry configured to select from the plurality of instruction syllables to output based on whether a required instruction syllable is addressable by an address in the first or second group;
switching circuitry configured to select, from the outputted instruction syllables, instruction syllables associated with one of the ways based on comparing at least part of the addresses provided by the addressing circuitry with the cache tags held in the storage locations; and
a buffer configured to hold the instruction syllables selected from the outputted instruction syllables and to bundle the instruction syllables in accordance with a VLIW (very long instruction word) format;
a plurality of execution lanes, each lane being supplied with a instruction syllable selected from the outputted instruction syllables; and
a bundling logic connected to the plurality of execution lanes and adapted to receive the outputted instruction syllables and to assemble a bundle in accordance with a very long instruction word (VLIW) format.

18. A processor according to claim 17, wherein in the same output cycle instruction syllables which are output by the selection circuitry addressable by an address in the first group are supplied to a first set of execution lanes, and instruction syllables output by the selection circuitry addressable by an address in the second group are output to a second set of execution lanes.

19. A handheld personal computer comprising circuitry configured to establish a wireless connection and a processor, wherein the processor comprises:
a main memory configured to hold instructions wherein each instruction comprises at least one instruction syllable;
a cache memory comprising a plurality of ways, each way comprising:
a first set of storage locations configured to hold instruction syllables and a cache tag where the instruction syllables are addressable by a first group of addresses, and
a second set of storage locations configured to hold instruction syllables and a cache tag in main memory where the instruction syllables are addressable by a second group of addresses;
addressing circuitry configured to provide in each addressing cycle a pair of addresses comprising one from the first group and one from the second group, thereby accessing a plurality of instruction syllables from each set of storage locations;
selection circuitry configured to select from the plurality of instruction syllables to output based on whether a required instruction syllable is addressable by an address in the first or second group;

switching circuitry configured to select from the outputted instruction syllables, instruction syllables associated with one of the ways, based on comparing at least part of the addresses provided by the addressing circuitry with the cache tags held in the storage locations;

a plurality of execution lanes, each lane being supplied with a instruction syllable selected from the outputted instruction syllables; and a buffer configured to hold the instruction syllables selected from the outputted instruction syllables and to bundle the instruction syllables in accordance with a VLIW (very long instruction word) format.

20. A video/audio decode unit for a set top box comprising a processor, wherein the processor comprises:

a main memory configured to hold instructions wherein each instruction comprises at least one instruction syllable;

a cache memory comprising a plurality of ways, each way comprising:

a first set of storage locations configured to hold instruction syllables and a cache tag where the instruction syllables are addressable by a first group of addresses, and a second set of storage locations configured to hold syllables and a cache tag in main memory where the instruction syllables are addressable by a second group of addresses;

addressing circuitry configured to provide in each addressing cycle a pair of addresses comprising one from the first group and one from the second group, thereby accessing a plurality of instruction syllables from each set of storage locations;

selection circuitry configured to select from said plurality of instruction syllables to output based on whether a required instruction syllable is addressable by an address in the first or second group; and switching circuitry configured to select from outputted instruction syllables, syllables associated with one of said ways, based on comparing at least part of the addresses provided by the addressing circuitry with the cache tags held in the storage locations;

a plurality of execution lanes, each lane being supplied with an instruction syllable selected from said outputted instruction syllables; and a buffer configured to hold the instruction syllables selected from said outputted instruction syllables and to bundle the instruction syllables in accordance with a VLIW (very long instruction word) format.

21. A method of operating a cache memory comprising a first set of storage locations (B0e) for holding instruction syllables and addressable by a first group of addresses, the method comprising:

providing in each addressing cycle a pair of addresses comprising one from the first group and one from a second group, thereby accessing a plurality of instruction syllables from each set of storage locations;

selecting from the plurality of instruction syllables to output to a processor lane based on whether a required instruction syllable is addressable by an address in the first or second group; and buffering the outputted instruction syllables; and bundling the instruction syllables in accordance with a VLIW (very long instruction word) format.

22. The method according to claim 21, wherein the first group of addresses are odd addresses and the second group of addresses are even addresses.

* * * * *